US012766984B2

(12) United States Patent
Lee

(10) Patent No.: US 12,766,984 B2
(45) Date of Patent: Oct. 20, 2026

(54) POWER SHARING SYSTEM AND POWER SHARING METHOD

(71) Applicants: Hyundai Motor Company, Seoul (KR); Kia Corporation, Seoul (KR)

(72) Inventor: Taeho Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 743 days.

(21) Appl. No.: 18/351,730

(22) Filed: Jul. 13, 2023

(65) Prior Publication Data

US 2024/0157820 A1 May 16, 2024

(30) Foreign Application Priority Data

Nov. 15, 2022 (KR) ........................ 10-2022-0152804

(51) Int. Cl.
*B60L 53/14* (2019.01)
*B60L 53/30* (2019.01)
*H02J 7/44* (2026.01)
*H02J 105/37* (2026.01)

(52) U.S. Cl.
CPC ............. *B60L 53/14* (2019.02); *B60L 53/305* (2019.02); *H02J 7/44* (2026.01); *H02J 2105/37* (2026.01)

(58) Field of Classification Search
CPC ...................................................... B60L 53/14
USPC .......................................................... 320/109
See application file for complete search history.

(56) References Cited

U.S. PATENT DOCUMENTS

| | | | | |
|---|---|---|---|---|
| 2010/0318250 | A1* | 12/2010 | Mitsutani | B60L 50/61 320/109 |
| 2015/0346698 | A1* | 12/2015 | Mailloux | B60L 53/63 307/31 |
| 2017/0134164 | A1* | 5/2017 | Haga | G06F 21/445 |
| 2021/0300202 | A1* | 9/2021 | Ogawa | B60L 55/00 |

* cited by examiner

*Primary Examiner* — Yalkew Fantu
(74) *Attorney, Agent, or Firm* — Slater Matsil, LLP

(57) ABSTRACT

An embodiment power sharing method includes determining a power state a plurality of vehicles and a plurality of charging devices, determining an amount of required power or an amount of surplus power of the vehicles and the charging devices based on the power state, in response to a determination that a first charging device requires additional power, searching for a first vehicle to supply the additional power to the first charging device, or in response to a determination that a second vehicle requires the additional power, searching for a second charging device to supply the additional power to the second vehicle based on the amount of the required power or the amount of the surplus power of the vehicles and the charging devices, and transmitting a result of the searching to the first charging device and the first vehicle or to the second charging device and the second vehicle.

20 Claims, 12 Drawing Sheets

FIG. 6

| | |
|---|---|
| DAILY MAXIMUM AMOUNT OF POWER GENERATION | 300kwh |
| ESTIMATED AMOUNT OF POWER GENERATION | 250kwh |
| ESTIMATED AMOUNT OF REQUIRED POWER | 100kwh |
| ESTIMATED AMOUNT OF SURPLUS POWER | 150kwh |

| | |
|---|---|
| DAILY MAXIMUM AMOUNT OF POWER GENERATION | 300kwh |
| ESTIMATED AMOUNT OF POWER GENERATION | 250kwh |
| ESTIMATED AMOUNT OF REQUIRED POWER | 300kwh |
| ESTIMATED AMOUNT OF POWER SHORTAGE | 50kwh |

FIG. 8

| ITEM | AMOUNT OF POWER |
|---|---|
| CURRENT REMAINING AMOUNT OF POWER | 30kwh |
| AMOUNT OF POWER REQUIRED FOR CHARGING | 70kwh |

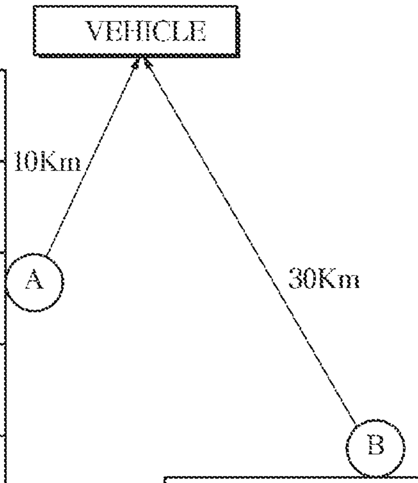

| ITEM | AMOUNT OF POWER |
|---|---|
| ESTIMATED AMOUNT OF POWER GENERATION | 250kwh |
| ESTIMATED AMOUNT OF REQUIRED POWER | 100kwh |
| ESTIMATED AMOUNT OF SURPLUS POWER | 150kwh |
| AMOUNT OF POWER CONSUMPTION BASED ON DISTANCE TRAVELED | 120kwh |

| ITEM | AMOUNT OF POWER |
|---|---|
| ESTIMATED AMOUNT OF POWER GENERATION | 180kwh |
| ESTIMATED AMOUNT OF REQUIRED POWER | 130kwh |
| ESTIMATED AMOUNT OF SURPLUS POWER | 50kwh |
| AMOUNT OF POWER CONSUMPTION BASED ON DISTANCE TRAVELED | 20kwh |

POWER SHARING SYSTEM AND POWER SHARING METHOD

CROSS-REFERENCE TO RELATED APPLICATIONS

This application claims the benefit of Korean Patent Application No. 10-2022-0152804, filed on Nov. 15, 2022, which application is hereby incorporated herein by reference.

TECHNICAL FIELD

The disclosure relates to a power sharing system and a power sharing method.

BACKGROUND

Recently, there is a tendency to shift to an eco-friendly power supply system such as solar power generation and wind power generation from a power supply system in which large-scale electricity is stably provided from a large-scale power plant such as nuclear power generation, thermal power generation, hydropower generation, and the like.

Such eco-friendly power generation is characterized by a small amount of power generation compared to large-scale power plants and a flexible amount of power generation depending on environmental factors such as weather and the like.

In terms of large-scale power plants, power is stably received from a large-scale power grid because a large amount of power generation is made. In terms of small power plants, however, a location and power generation state of a small power plant may not be easily identified, and the amount of power generation is flexible, and thus surplus power may not be relatively effectively identified.

Accordingly, in an environment gradually shifted to eco-friendly power grids, smart mobility devices including electric vehicles are not effectively supplied with power from small power plants.

Also, when the amount of power generation is insufficient in a small power plant due to environmental factors such as weather, power is required to be supplied from the outside.

SUMMARY

The disclosure relates to a power sharing system and a power sharing method. Particular embodiments relate to a power sharing system and a power sharing method that may share power between a vehicle and a charging device.

An embodiment of the disclosure provides a power sharing system and a power sharing method that may effectively share power between an electric vehicle (mobility device) and an eco-friendly power plant with variable power output.

Additional embodiments of the disclosure will be set forth in part in the description which follows and, in part, will be obvious from the description, or may be learned by practice of the disclosure.

In accordance with an embodiment of the disclosure, a power sharing method may include determining a power state of each of a plurality of vehicles and a power state of each of a plurality of charging devices, determining an amount of required power or an amount of surplus power of each of the plurality of vehicles and each of the plurality of charging devices, based on the power state of each of the plurality of vehicles and the power state of each of the plurality of charging devices, searching for a vehicle to supply power to a charging device among the plurality of vehicles or searching for a charging device to supply power to a vehicle among the plurality of charging devices based on the amount of required power or the amount of surplus power, and transmitting a result of the search to the searched charging device and the searched vehicle.

The determining of the amount of required power or the amount of surplus power of each of the plurality of charging devices may include determining the amount of required power or the amount of surplus power of each of the plurality of charging devices based on an estimated amount of power generation and an estimated amount of required power of each of the plurality of charging devices.

The searching for the vehicle to supply power to the charging device may include searching for the vehicle based on an amount of power shortage of the charging device and a power state of the vehicle in response to the charging device requiring power.

The power state of the vehicle may include information about an amount of surplus power of the vehicle and an amount of power consumption based on a distance traveled to the charging device.

The searching for the vehicle to supply power to the charging device may include searching for the vehicle as the vehicle to supply power to the charging device in response to an amount of power obtained by excluding the amount of power consumption based on the distance traveled to the charging device from the amount of surplus power of the vehicle being greater than the amount of power shortage of the charging device.

The searching for the charging device to supply power to the vehicle may include searching for the charging device to supply power to the vehicle based on the amount of surplus power of each of the plurality of charging devices and a power state of the vehicle in response to the vehicle requiring power.

The power state of the vehicle may include information about an amount of required power of the vehicle and an amount of power consumption based on a distance traveled to the charging device.

The searching for the charging device to supply power to the vehicle may include searching for the charging device as the charging device to supply power to the vehicle in response to an amount of power obtained by adding the amount of required power of the vehicle and the amount of power consumption based on the distance traveled to the charging device being less than an amount of surplus power of the charging device.

In accordance with an embodiment of the disclosure, a power sharing system may include a plurality of vehicles configured to determine an amount of required power or an amount of surplus power of each of the plurality of vehicles based on a power state of each of the plurality of vehicles, a plurality of charging devices configured to determine an amount of required power or an amount of surplus power of each of the plurality of charging devices based on a power state of each of the plurality of charging devices, a communicator configured to communicate with the plurality of vehicles and the plurality of charging devices, and a controller configured to search for a vehicle to supply power to a charging device or a charging device to supply power to a vehicle based on the amount of required power or the amount of surplus power of each of the plurality of vehicles and the amount of required power or the amount of surplus power of each of the plurality of charging devices received through the communicator and to transmit a result of the search to the searched charging device and the searched vehicle through the communicator.

The plurality of charging devices may be configured to determine the amount of required power or the amount of surplus power of each of the plurality of charging devices based on an estimated amount of power generation and an estimated amount of required power of each of the plurality of charging devices.

The controller may be configured to search for the vehicle based on an amount of power shortage of the charging device and a power state of the vehicle in response to the charging device requiring power.

The power state of the vehicle may include information about an amount of surplus power of the vehicle and an amount of power consumption based on a distance traveled to the charging device.

The controller may be configured to search for the vehicle as the vehicle to supply power to the charging device in response to an amount of power obtained by excluding the amount of power consumption based on the distance traveled to the charging device from the amount of surplus power of the vehicle being greater than the amount of power shortage of the charging device.

The controller may be configured to search for the charging device to supply power to the vehicle based on the amount of surplus power of each of the plurality of charging devices and a power state of the vehicle in response to the vehicle requiring power.

The power state of the vehicle may include information about an amount of required power of the vehicle and an amount of power consumption based on a distance traveled to the charging device.

The controller may be configured to search for the charging device as the charging device to supply power to the vehicle in response to an amount of power obtained by adding the amount of required power of the vehicle and the amount of power consumption based on the distance traveled to the charging device being less than an amount of surplus power of the charging device.

BRIEF DESCRIPTION OF THE DRAWINGS

These and/or other embodiments of the disclosure will become apparent and more readily appreciated from the following description of the embodiments, taken in conjunction with the accompanying drawings of which:

FIG. 6 is a diagram illustrating surplus power and required power of a charging device according to an embodiment;

FIG. 8 is a diagram illustrating an example of searching for a charging device to supply power to a vehicle among a plurality of charging devices according to an embodiment;

DETAILED DESCRIPTION OF ILLUSTRATIVE EMBODIMENTS

Figure 1:
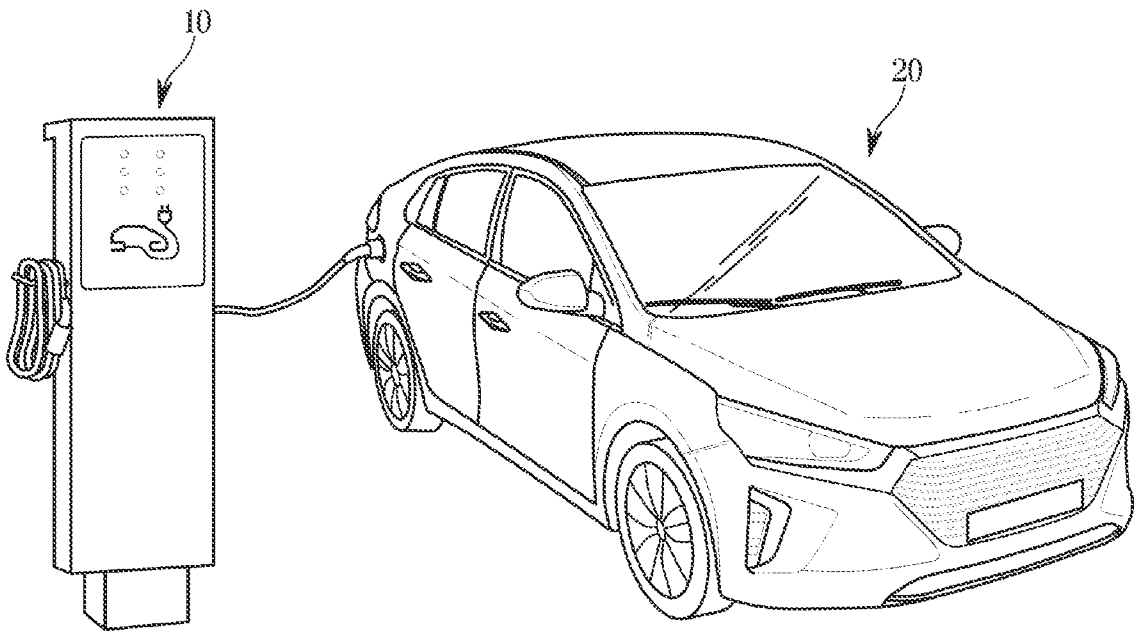
FIG. 1 is a diagram illustrating an example of power exchange between a vehicle and a charging device according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part," "~module," and the like may refer to at least one process processed by at least one hardware or software. According to embodiments, a plurality of "~parts" or "~modules" may be embodied as a single element, or a single of a "~part" or "~module" may include a plurality of elements.

The embodiments set forth herein and illustrated in the configuration of the present disclosure are only preferred embodiments, so it should be understood that they may be replaced with various equivalents and modifications.

Terminologies used herein are for the purpose of describing particular embodiments only and are not intended to limit embodiments of the present disclosure. It is to be understood that the singular forms are intended to include the plural forms as well, unless the context clearly dictates otherwise. It will be further understood that the terms "include," "comprise," and/or "have" when used in this specification specify the presence of stated features, integers, steps, operations, elements, and/or components, but do not preclude the presence or addition of one or more other features, integers, steps, operations, elements, components, and/or groups thereof.

Further, the terms such as "~part," "—device," "—block," "—member," "~module," and the like may refer to a unit for processing at least one function or act. For example, the terms may refer to at least a process processed by at least one hardware component, such as a field-programmable gate array (FPGA) and/or an application specific integrated circuit (ASIC), or software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

Meanwhile, the embodiments of the disclosure can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored, for example, a read only memory (ROM), a random access memory (RAM), magnetic tapes, magnetic disks, flash memories, an optical recording medium, and the like.

Hereinafter, embodiments of the disclosure are described in detail with reference to the accompanying drawings.

Figure 2:
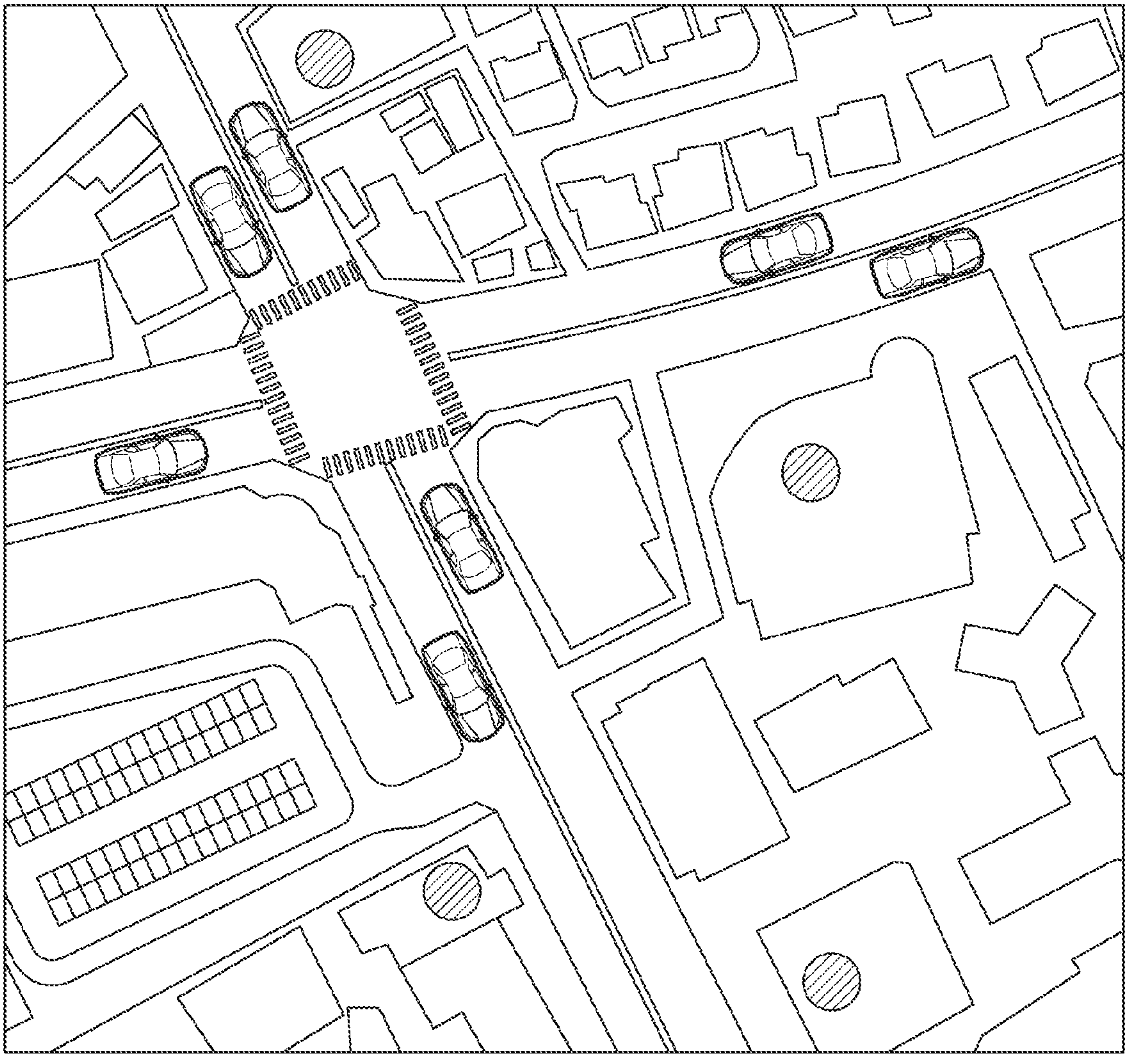
FIG. 2 is a diagram illustrating an example of vehicles and charging devices on a map according to an embodiment.

FIG. 1 is a diagram illustrating an example of power exchange between a vehicle and a charging device according to an embodiment. FIG. 2 is a diagram illustrating an example of vehicles and charging devices on a map according to an embodiment.

A charging device 10 may include a power supply device supplying power to a vehicle 20 and a storage battery installed inside the vehicle 20.

The vehicle 20 is a device capable of travelling on a road, a track, and the like. The vehicle 20 may include a generally used four-wheeled vehicle. The vehicle 20 may also include a two-wheeled vehicle, a construction machine, a robot, a train, and the like.

The vehicle 20 may obtain power based on an operation of a drive motor using electrical energy and rotate wheels of the vehicle 20 using the obtained power, thereby driving.

For example, the vehicle 20 may include at least one of a general electric vehicle, a hybrid electric vehicle, or a plug-in hybrid electric vehicle. The plug-in hybrid electric vehicle may be one of a micro plug-in hybrid electric vehicle, a soft plug-in hybrid electric vehicle, or a full plug-in hybrid electric vehicle, depending on a degree of use of the drive motor.

Referring to FIG. 1, the vehicle 20 may include a vehicle body defining an exterior of the vehicle 20, a drive motor mounted inside the vehicle body and converting electrical energy into power energy, and a storage battery accumulating electrical energy and supplying electrical energy to the drive motor as required. According to embodiments, the vehicle 20 may be further provided with an engine converting combustion energy of fossil fuels such as gasoline or diesel into power energy.

A power receiver may be formed on an outer surface of the vehicle body to receive electrical energy to be stored in the storage battery from the power supply device outside the vehicle 20. According to embodiments, the power receiver may be mounted on at least one point on the outer surface of the vehicle body. For example, the power receiver may be formed on a front fender or a rear fender of the vehicle 20. Also, the power receiver may be formed on a front of the vehicle body such as a front portion of a bonnet connected to the vehicle body. Furthermore, the power receiver may be formed at various points on the outer surface of the vehicle body according to a vehicle designer's selection.

The power receiver may include an opening/closing part that may be opened or closed to expose or cover a terminal part for coupling or separating a power supply connector formed at one end of a power supply cable.

The terminal part may include an insertion groove into which the power supply connector may be inserted and mounted and at least one connection pin provided inside the insertion groove. When the power supply connector is mounted in the insertion groove, the at least one connection pin is inserted into a hole (not shown) of the power supply connector, and thus the at least one connection pin may be electrically connected to the power supply connector. Accordingly, the vehicle 20 is electrically connected to an external power supply device.

As required, the terminal part may further include at least one cover opening or closing the insertion groove to protect the insertion groove and the connection pin from an external stimulus.

A connection cable may electrically connect the vehicle 20 and the power supply device, thereby transmitting current provided by the power supply device to the vehicle 20. A connector capable of coupling or separating from the insertion groove of the vehicle 20 is formed at one end of the connection cable, and the other end of the connection cable is fixed to the power supply device.

The power supply device is provided to supply the vehicle 20 with power required to operate the vehicle 20. The power supply device supplies current to the vehicle 20 through the connection cable, and a battery of the vehicle 20 is charged by the supplied current.

The power supply device may be supplied with electrical energy from an external commercial power source and may provide the supplied electrical energy to the vehicle 20. In this case, the external commercial power source may be an alternating current (AC) or direct current (DC) power supply. The power supply device may provide AC or DC to the vehicle 20.

According to embodiments, the power supply device may be designed to maintain or change a voltage and/or current of an electrical signal supplied from the commercial power source and output the maintained or changed voltage and/or current. The power supply device may also be designed to measure the amount of power charged in the vehicle 20 as required or to provide a user with information about whether charging of the vehicle 20 starts or a degree of charging.

According to embodiments, the power supply device may include at least one of a slow charger or a quick charger.

According to embodiments, the power supply device may include an electric vehicle supply equipment (EVSE) which is installed around a place for the vehicle 20 to be parked or stopped for charging the vehicle 20.

Figure 3A:
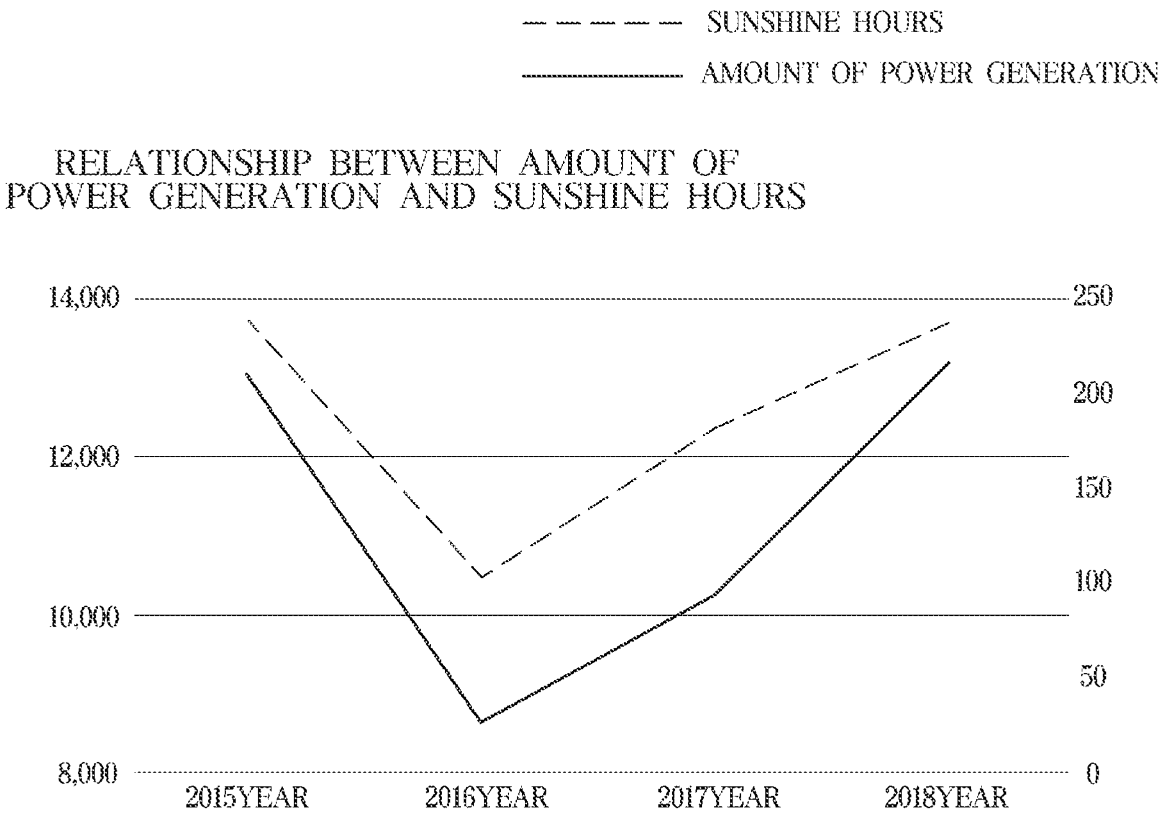
FIG. 3A, FIG. 3B, and FIG. 3C are graphs illustrating changes in power generation amount depending on an environment according to an embodiment.
Figure 3B:
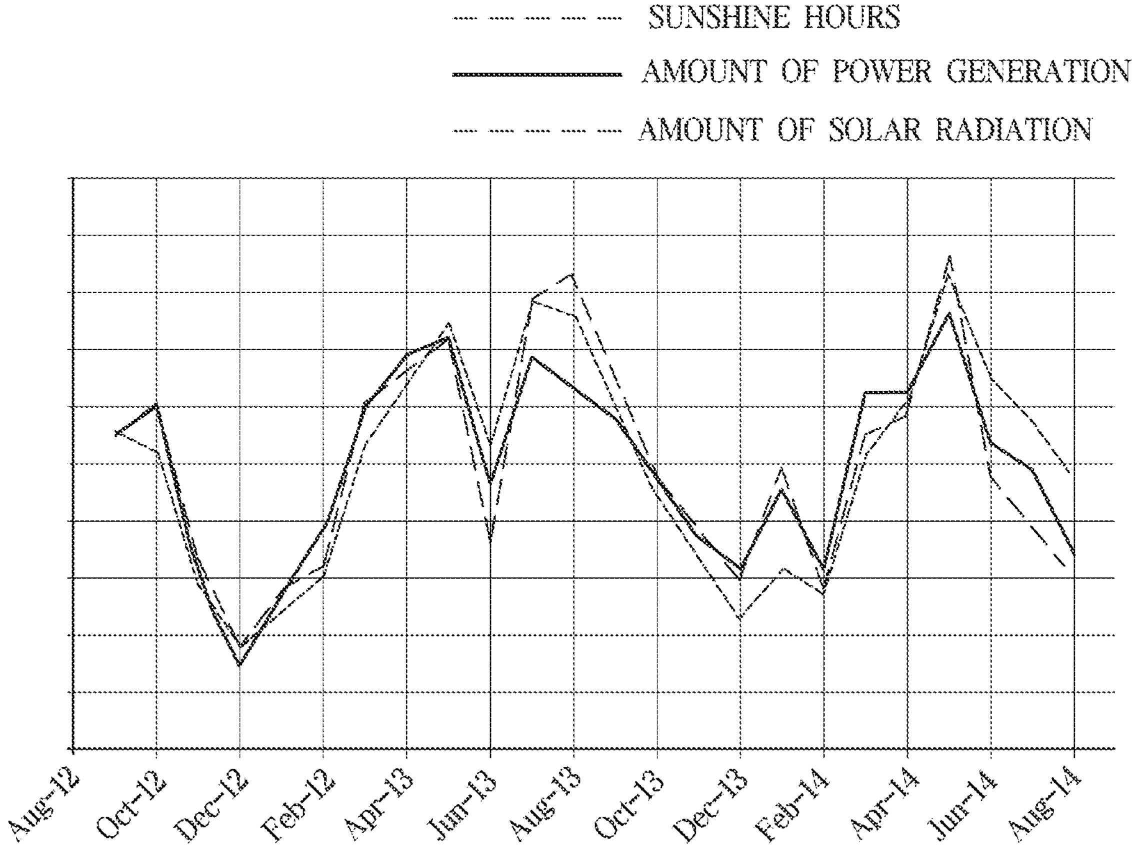
Figure 3C:
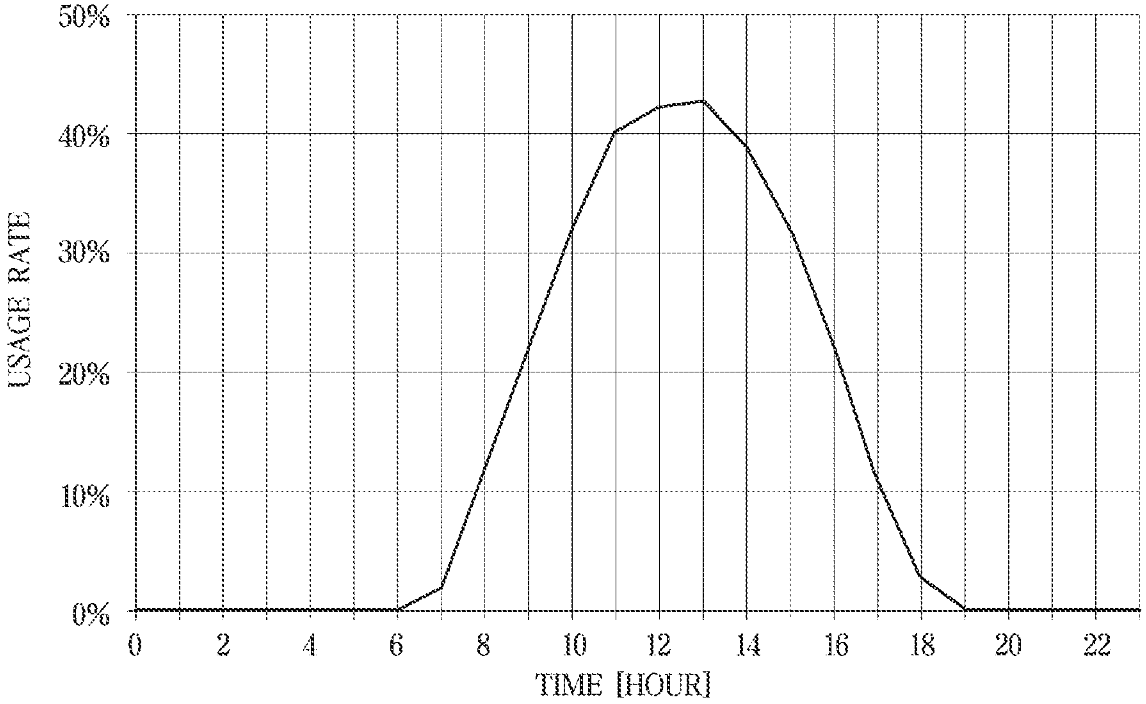

FIGS. 3A-3C are diagrams illustrating changes in a power generation amount depending on an environment according to an embodiment.

FIG. 3A is a graph illustrating a change in a power generation amount depending on sunshine hours.

Referring to FIG. 3A, because the amount of sunshine is not constant every year, it may be seen that the amount of power generation varies, i.e., the amount of power generation according to sunshine hours is higher or lower in a specific year compared to other years.

FIG. 3B is a graph illustrating a change in a power generation amount depending on the season.

Referring to FIG. 3B, it may be seen that a change in a power generation amount depending on the season is large, i.e., the amount of power generation is low in the winter where sunshine hours and the amount of solar radiation are low, and the amount of power generation is high in the summer where sunshine hours and the amount of solar radiation are high.

FIG. 3C is a graph illustrating an hourly usage rate of a power plant during one day.

In terms of solar energy generation, it may be seen that a usage rate is highest around noon when the amount of sunshine is greatest, but a usage rate is 0% from late night to morning. Also, a usage rate is approximately 40% even at the time of the highest usage rate, which is often less than a total operating capacity of a power plant.

As such, in terms of eco-friendly power generation, the amount of power generation is significantly affected by the season, the amount of sunshine, and the like, and the amount of power generation fluctuates greatly due to other environmental factors such as cloudiness, wind volume, wind speed, and the like. That is, stable power supply may not be performed.

Accordingly, smart mobility devices including the electric vehicle 20 may not be effectively supplied with power from a small power grid, and when the amount of power generation is insufficient in a small power plant due to environmental factors such as weather, power is required to be supplied from an outside.

Hereinafter, a power sharing system 1 and a power sharing method to overcome the above disadvantages are described.

Figure 4:
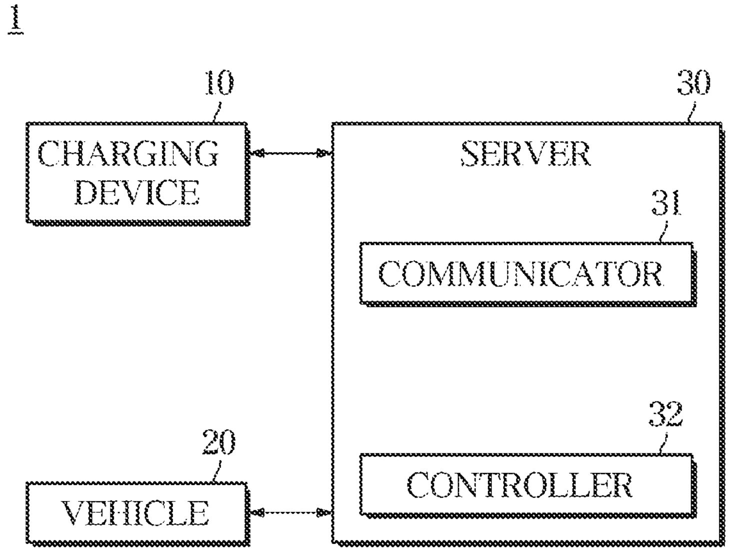
FIG. 4 is a control block diagram illustrating a power sharing system according to an embodiment.

FIG. 4 is a control block diagram illustrating a power sharing system according to an embodiment.

The power sharing system 1 may include the charging device 10, the vehicle 20, and a server 30. The server 30 may include a controller 32 and a communicator 31 communicating with the charging device 10 and the vehicle 20.

A plurality of vehicles 20 may determine a power state of each of the plurality of vehicles 20 and determine the amount of required power or the amount of surplus power based on the determined power state.

That is, each of the plurality of vehicles 20 may determine whether charging is required and how much power is required based on the current remaining amount of power.

A plurality of charging devices 10 may determine a power state of each of the plurality of charging devices 10 and determine the amount of required power or the amount of surplus power based on the determined power state.

That is, each of the plurality of charging devices 10 may determine whether charging is required and how much power is required based on the current remaining amount of power.

As described above, in terms of eco-friendly power generation, the amount of power generation may vary due to environmental factors, and thus the amount of required power or the amount of surplus power may be determined based on a power state.

The communicator 31 may communicate with the plurality of vehicles 20 and the plurality of charging devices 10.

The communicator 31 may receive information about the amount of required power or the amount of surplus power of each of the plurality of vehicles 20 and each of the plurality of charging devices 10 from each of the plurality of vehicles 20 and each of the plurality of charging devices 10.

The controller 32 may search for the vehicle 20 to supply power to the charging device 10 based on the amount of required power or the amount of surplus power of each of the plurality of vehicles 20 and each of the plurality of charging devices 10 received through the communicator 31.

Also, the controller 32 may search for the charging device 10 to supply power to the vehicle 20.

For example, when the vehicle 20 lacks power, the charging device 10 to supply power to the vehicle 20 may be searched for by determining the amount of required power of the vehicle 20 and the amount of surplus power of the charging device 10.

The controller 32 may transmit a result of the search to the searched charging device 10 and vehicle 20 through the communicator 31.

The controller 32 may include a memory storing control data and a control program for searching for the vehicle 20 to supply power to the charging device 10 or searching for the charging device 10 to supply power to the vehicle 20 and at least one processor generating a control signal according to the control program and the control data stored in the memory. The memory and the at least one processor may be provided integrally or may be separated.

The memory may store data and a program for searching for the vehicle 20 or the charging device 10.

The memory may include a volatile memory such as a static random access memory (SRAM), a dynamic random access memory (DRAM), etc., to temporarily store data, and a non-volatile memory such as a read only memory (ROM), an erasable programmable read only memory (EPROM), an electrically erasable programmable read only memory (EEPROM), etc., for long-term data storage.

The at least one processor may include various logic circuits and arithmetic circuits, may process data according to a program provided from the memory, and may generate a control signal according to a result of processing.

Figure 5:
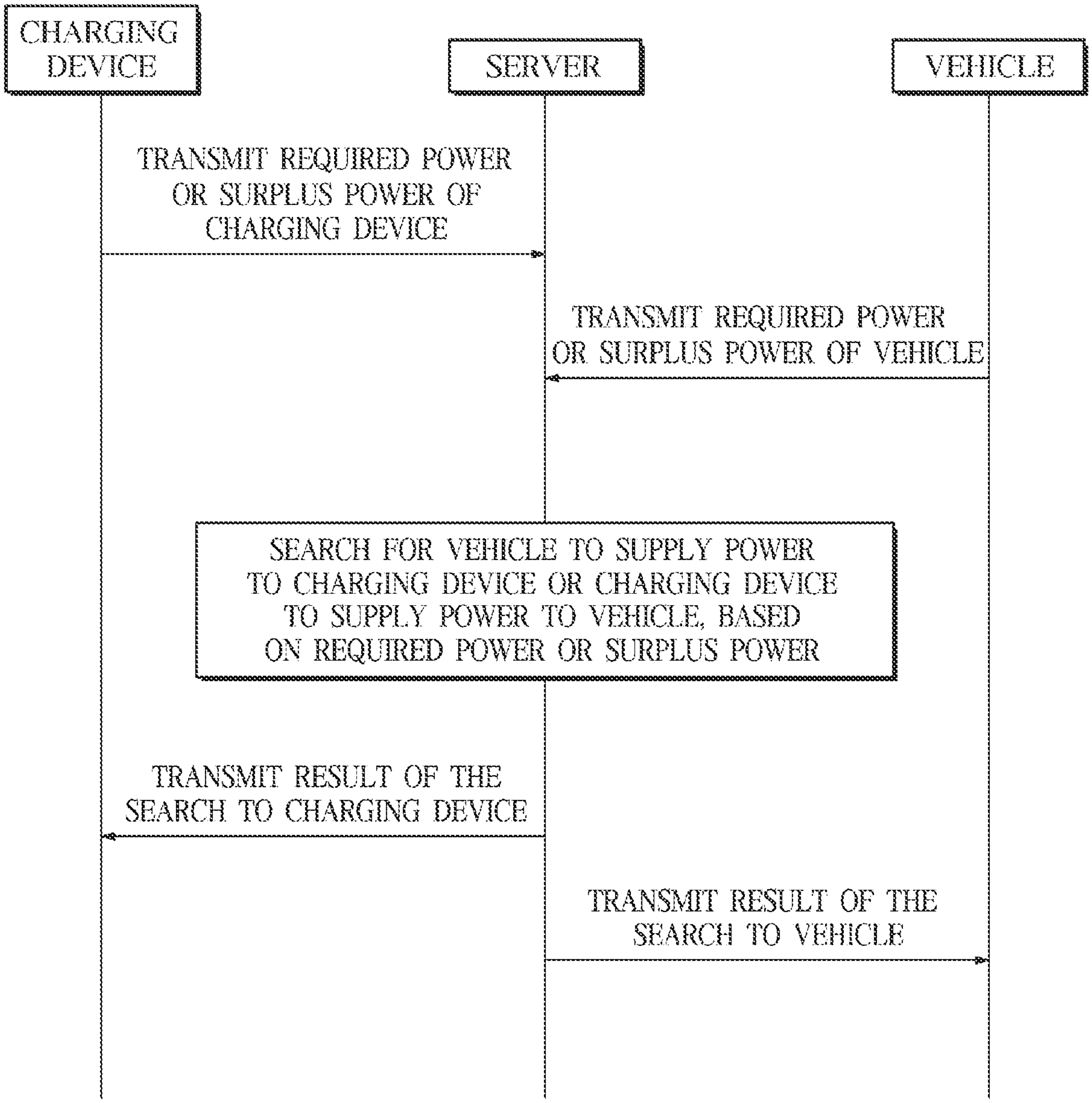
FIG. 5 is a flowchart of operations of each configuration for power sharing according to an embodiment.

FIG. 5 is a flowchart of operations of each configuration for power sharing according to an embodiment.

The charging device 10 may determine a power state of the charging device 10 and determine the amount of required power or the amount of surplus power based on the determined power state.

The charging device 10 may transmit information about the amount of required power or the amount of surplus power to the server 30.

Also, the vehicle 20 may determine a power state of the vehicle 20, and determine the amount of required power or the amount of surplus power based on the determined power state.

The vehicle 20 may transmit information about the amount of required power or the amount of surplus power to the server 30.

The server 30 may search for the vehicle 20 to supply power to the charging device 10 based on the amount of required power or the amount of surplus power of the plurality of vehicles 20 and the plurality of charging devices 10 received through the communicator 31. The server 30 may also search for the charging device 10 to supply power to the vehicle 20.

The server 30 may transmit a result of the search to the searched charging device 10 and vehicle 20 through the communicator 31.

Accordingly, by searching for and matching the vehicle 20 and the charging device 10 to supply or to be supplied with power based on the amount of required power or the amount of surplus power of each of the vehicles 20 and each of the charging devices 10, power may be effectively shared.

FIG. 6 is a diagram illustrating surplus power and required power of a charging device according to an embodiment.

Each of the plurality of charging devices 10 may determine the amount of required power or the amount of surplus power based on an estimated amount of power generation and an estimated amount of required power of each of the plurality of charging devices 10.

For example, when an estimated daily amount of power generation of the charging device 10 is 250 kwh and an estimated daily amount of required power of the charging device 10 is 100 kwh, the charging device 10 may determine that the amount of surplus power is 150 kwh.

In this case, the charging device 10 may supply power to the vehicle 20 which is required to be charged within a limit of the surplus power amount.

Also, when an estimated daily amount of power generation of the charging device 10 is 250 kwh and an estimated daily amount of required power of the charging device 10 is 300 kwh, the charging device 10 may determine that an amount of power shortage is 50 kwh.

In this case, power may be supplied from the vehicle 20 having surplus power within a limit of surplus power of the vehicle 20.

Hereinafter, an example where the vehicle 20 is supplied with power from the charging device 10 and an example where the charging device 10 is supplied with power from the vehicle 20 are described.

Figure 7:
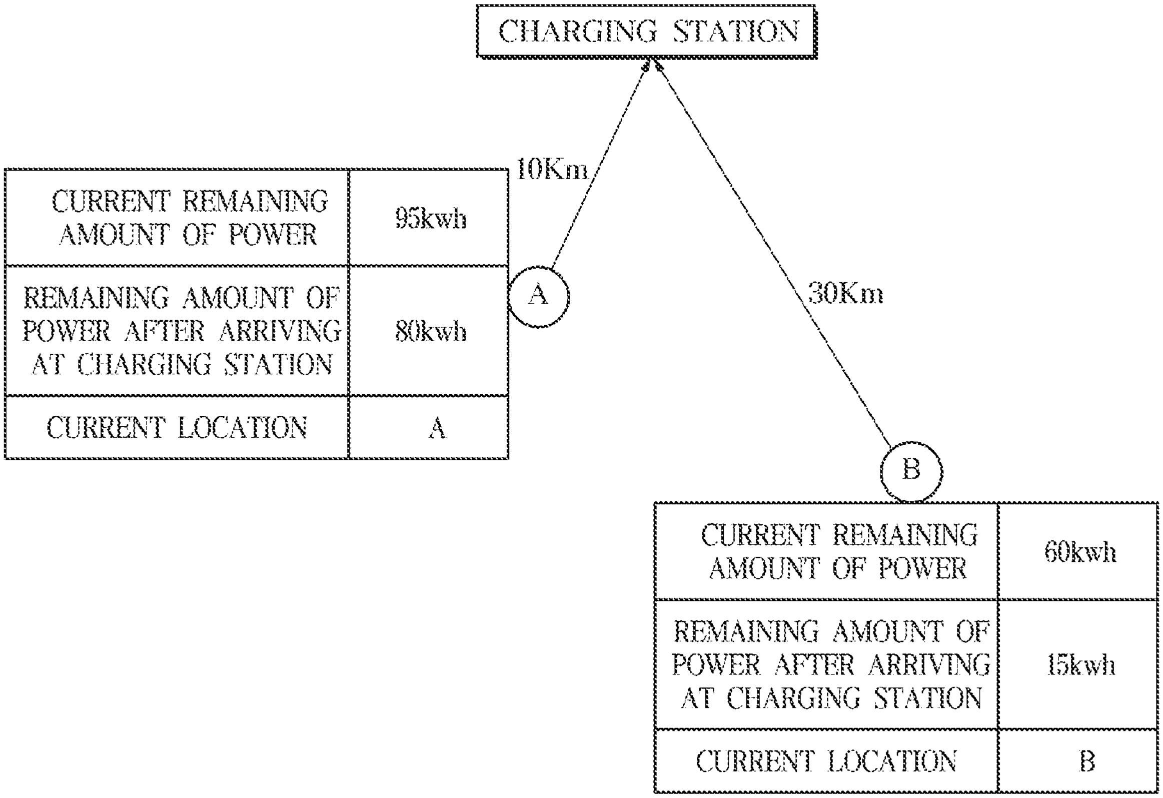
FIG. 7 is a diagram illustrating an example of searching for a vehicle to supply power to a charging device among a plurality of vehicles according to an embodiment.

FIG. 7 is a diagram illustrating an example of searching for a vehicle to supply power to a charging device among a plurality of vehicles according to an embodiment.

As shown in FIG. 6, it is assumed that the charging device 10 requires power and the amount of required power is 50 kwh.

When the charging device 10 requires power, the controller 32 may search for the vehicle 20 to supply power to the charging device 10 based on the amount of power shortage of the charging device 10 and a power state of the vehicle 20.

In this instance, the power state of the vehicle 20 may include information about the amount of surplus power of the vehicle 20 and the amount of power consumption based on a distance traveled to the charging device 10.

For example, as shown in FIG. 7, when two vehicles 20 exist in a location A and a location B, respectively, the controller 32 may search for the vehicle 20 to supply power to the charging device 10.

For the vehicle 20 at the location A, the amount of surplus power (the current remaining amount of power) is 95 kwh and the remaining amount of power after arriving at the charging device 10 may be 80 kwh.

For the vehicle 20 at the location B, the amount of surplus power is 60 kwh and the remaining amount of power after arriving at the charging device 10 may be 15 kwh.

When the amount of power obtained by excluding the amount of power consumption based on a distance traveled to the charging device 10 from the amount of surplus power of the vehicle 20 is greater than the amount of power shortage of the charging device 10, the controller 32 may search for the corresponding vehicle 20 which is the vehicle 20 to supply power to the charging device.

For the vehicle 20 at the location B, when arriving at the charging device 10, the remaining amount of power is 15 kwh, which is less than the amount of required power of 50 kwh of the charging device 10.

Accordingly, the controller 32 may determine the vehicle 20 to supply power to the charging device 10 as the vehicle 20 at the location A, because the vehicle 20 at the location A has the remaining amount of power of 80 kwh satisfying the amount of required power of the charging device 10, when arriving at the charging device 10.

In this instance, the controller 32 may transmit a result of the search to the charging device 10 and the vehicle 20 at the location A through the communicator 31.

FIG. 8 is a diagram illustrating an example of searching for a charging device to supply power to a vehicle among a plurality of charging devices according to an embodiment.

When the vehicle 20 requires power, the controller 32 may search for the charging device 10 to supply power to the vehicle 20 based on the amount of surplus power of the plurality of charging devices 10 and a power state of the vehicle 20.

In this instance, the power state of the vehicle 20 may include information about the amount of required power of the vehicle 20 and the amount of power consumption based on a distance traveled to the charging device 10.

For example, as shown in FIG. 8, it may be assumed that the amount of power required for charging is 70 kwh due to the remaining amount of power of the vehicle 20 of 30 kwh.

For the charging device 10 at a location A, the amount of surplus power is 150 kwh and the amount of power consumption of the vehicle 20 based on a distance traveled to the charging device 10 at the location A may be 120 kwh.

For the charging device 10 at a location B, the amount of surplus power is 50 kwh and the amount of power consumption of the vehicle 20 based on a distance traveled to the charging device 10 at the location B may be 20 kwh.

When the amount of power obtained by adding the amount of required power of the vehicle 20 and the amount of power consumption based on the distance traveled to the charging device 10 is less than the amount of surplus power of the charging device 10, the controller 32 may search for the corresponding charging device 10 which is the charging device 10 to supply power to the vehicle 20.

The charging device 10 at the location B has the amount of surplus power of 50 kwh, which is less than the amount of power obtained by adding the amount of required power of the vehicle 20 and the amount of power consumption based on the distance traveled to the charging device 10 and is also less than the amount of required power of the vehicle 20.

Accordingly, the controller 32 may determine the charging device 10 to supply power to the vehicle 20 as the charging device 10 at the location A having the amount of surplus power of 150 kwh which is greater than the amount of power obtained by adding the amount of required power of the vehicle 20 and the amount of power consumption based on the distance traveled to the charging device 10.

In this instance, the controller 32 may transmit a result of the search to the vehicle 20 and the charging device 10 at the location A through the communicator 31.

Figure 9:
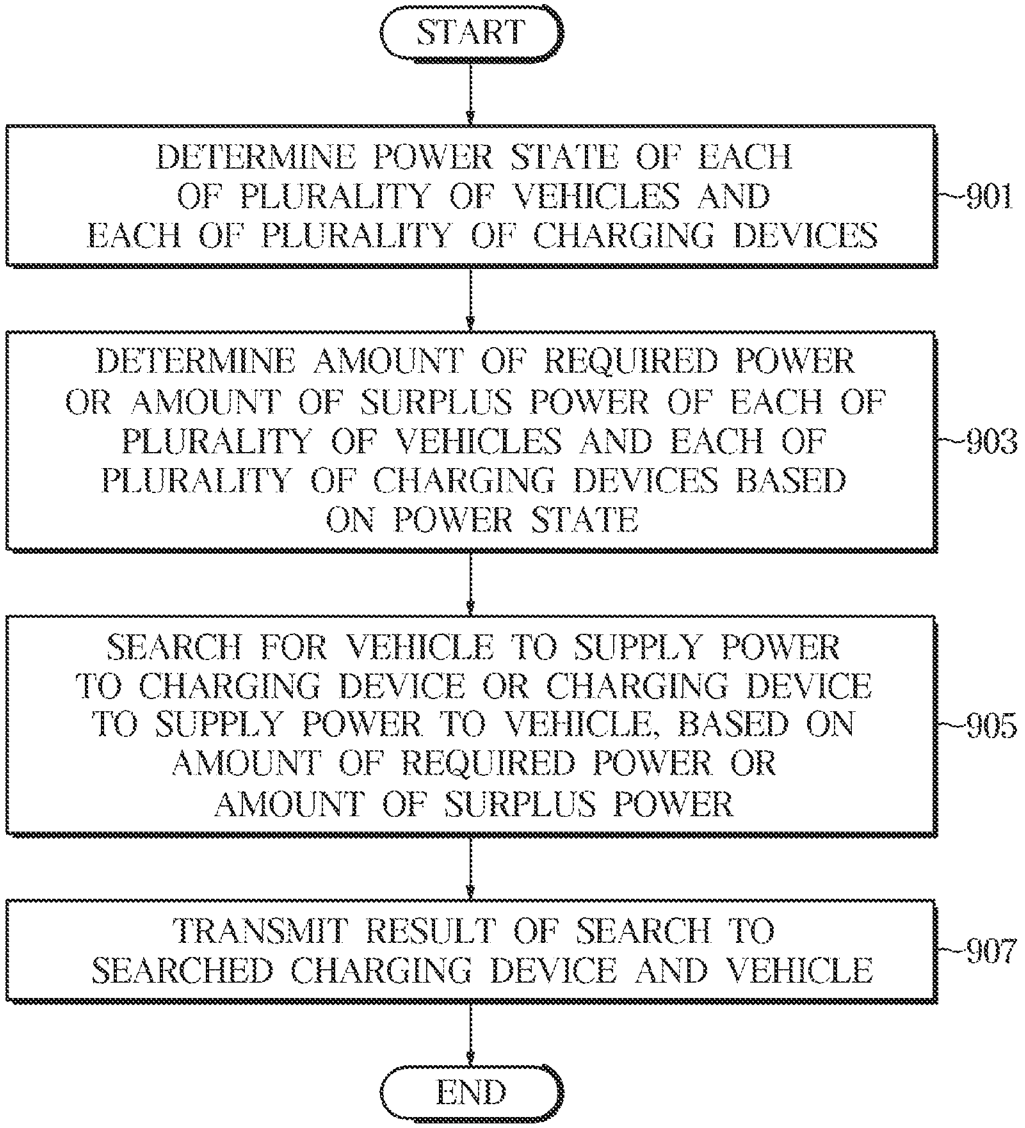
FIG. 9 is a flowchart illustrating operations of a power sharing method according to an embodiment.
Figure 10:
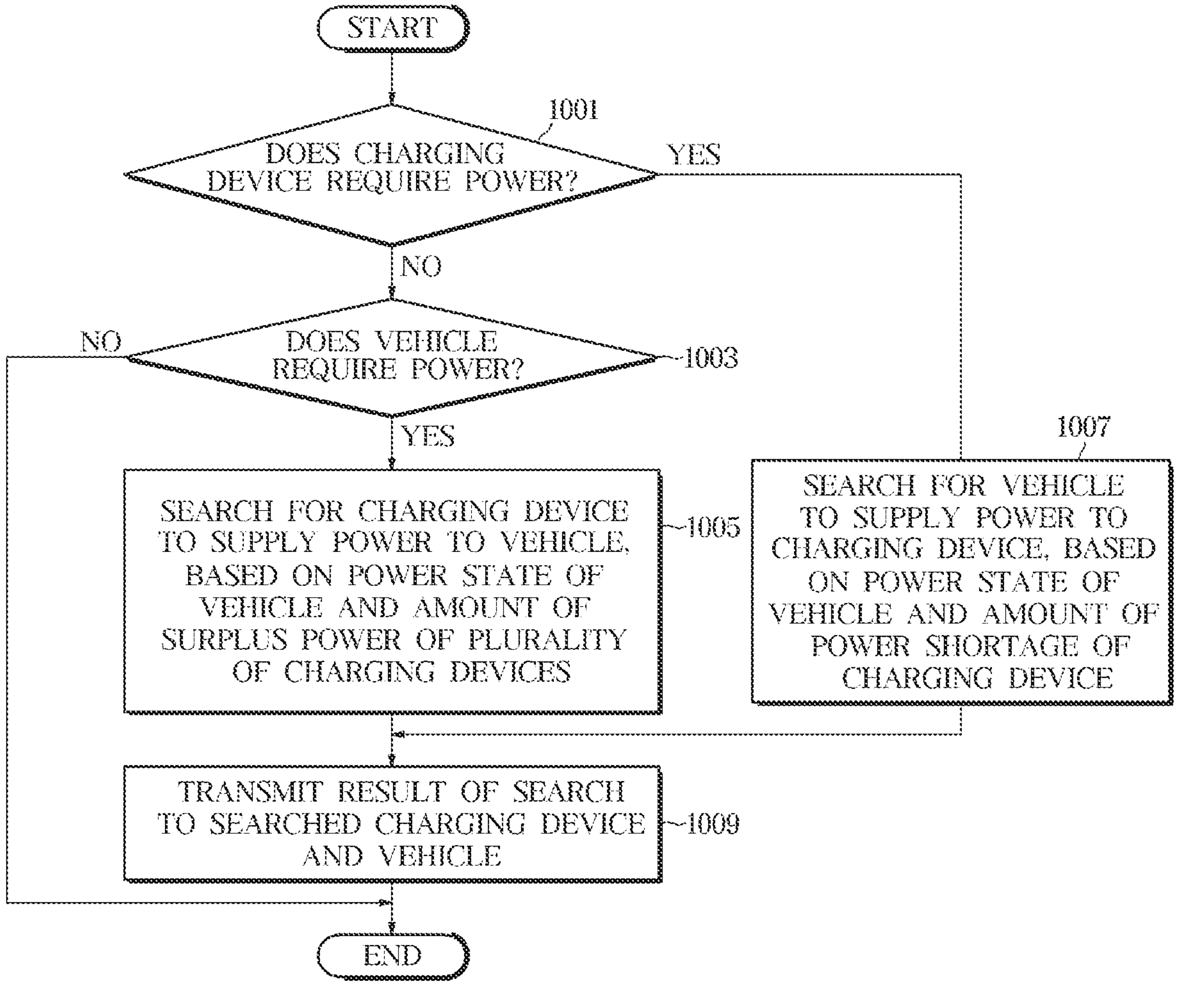
FIG. 10 is a flowchart illustrating operations of a power sharing method according to an embodiment.

FIG. 9 and FIG. 10 are flowcharts illustrating operations of a power sharing method according to an embodiment.

The plurality of vehicles 20 may determine a power state of each of the plurality of vehicles 20 (901) and determine the amount of required power or the amount of surplus power based on the determined power state (903).

That is, each of the plurality of vehicles 20 may determine whether charging is required and how much power is required based on the current remaining amount of power.

The plurality of charging devices 10 may determine a power state of each of the plurality of charging devices 10 (901) and determine the amount of required power or the amount of surplus power based on the determined power state (903).

That is, each of the plurality of charging devices 10 may determine whether charging is required and how much power is required based on the current remaining amount of power.

The controller 32 may search for the vehicle 20 to supply power to the charging device 10 based on the amount of required power or the amount of surplus power of each of the plurality of vehicles 20 and each of the plurality of charging devices 10 received through the communicator 31. Also, the controller 32 may search for the charging device 10 to supply power to the vehicle 20 (905).

For example, when the vehicle 20 lacks power, the charging device 10 to supply power to the vehicle 20 may be searched for by determining the amount of required power of the vehicle 20 and the amount of surplus power of the charging device 10.

The controller 32 may transmit a result of the search to the searched charging device 10 and vehicle 20 through the communicator 31 (907).

The plurality of vehicles 20 may determine a power state of each of the plurality of vehicles 20 and determine the amount of required power or the amount of surplus power based on the determined power state.

That is, each of the plurality of vehicles 20 may determine whether charging is required, and how much power is required based on the current remaining amount of power.

The plurality of charging devices 10 may determine a power state of each of the plurality of charging devices 10 and determine the amount of required power or the amount of surplus power based on the determined power state.

That is, each of the plurality of charging devices 10 may determine whether charging is required and how much power is required based on the current remaining amount of power.

As described above, in terms of eco-friendly power generation, the amount of power generation may vary due to environmental factors, and thus the amount of required power or the amount of surplus power may be determined based on a power state.

When the charging device 10 requires power (Yes in operation 1001), the controller 32 may search for the vehicle 20 to supply power to the charging device 10 based on the power state of the vehicle 20 and the amount of power shortage of the charging device 10 (1007).

In this instance, the power state of the vehicle 20 may include information about the amount of surplus power of the vehicle 20 and the amount of power consumption based on a distance traveled to the charging device 10.

When the vehicle 20 requires power (Yes in operation 1003), the controller 32 may search for the charging device 10 to supply power to the vehicle 20 based on the power state of the vehicle 20 and the amount of surplus power of the plurality of charging devices 10 (1005).

In this instance, the power state of the vehicle 20 may include information about the amount of required power of the vehicle 20 and the amount of power consumption based on a distance traveled to the charging device 10.

The controller 32 may transmit a result of the search to the searched charging device 10 and vehicle 20 (1009).

According to embodiments of the disclosure, power may be effectively shared between an electric vehicle (mobility device) and an eco-friendly power plant with variable power output.

As is apparent from the above, according to the embodiments of the disclosure, a power sharing system and a power sharing method can effectively share power between an electric vehicle (mobility device) and an eco-friendly power plant with variable power output.

Although embodiments have been described for illustrative purposes, those skilled in the art will appreciate that various modifications, additions, and substitutions are possible, without departing from the scope and spirit of the disclosure. Therefore, embodiments have not been described for limiting purposes.

What is claimed is:

1. A power sharing method, the method comprising:

determining a power state of each of a plurality of vehicles and a power state of each of a plurality of charging devices;

determining an amount of required power or an amount of surplus power of each of the plurality of vehicles and each of the plurality of charging devices based on the power state of each of the plurality of vehicles and the power state of each of the plurality of charging devices;

in response to a determination that a first charging device among the plurality of charging devices requires additional power, searching for a first vehicle among the plurality of vehicles to supply the additional power to the first charging device, or in response to a determination that a second vehicle among the plurality of vehicles requires the additional power, searching for a second charging device among the plurality of charging devices to supply the additional power to the second vehicle based on the amount of the required power or the amount of the surplus power of each of the plurality of vehicles and each of the plurality of charging devices; and transmitting a result of the searching to the first charging device and the first vehicle or to the second charging device and the second vehicle.

2. The method of claim 1, wherein determining the amount of the required power or the amount of the surplus power of each of the plurality of charging devices comprises determining the amount of the required power or the amount of the surplus power of each of the plurality of charging devices based on an estimated amount of power generation and an estimated amount of the required power of each of the plurality of charging devices.

3. The method of claim 1, wherein searching for the first vehicle to supply the additional power to the first charging device comprises searching for the first vehicle based on an amount of a power shortage of the first charging device and the power state of the first vehicle.

4. The method of claim 3, wherein the power state of the first vehicle comprises information about the amount of the surplus power of the first vehicle and an amount of power consumption based on a traveling distance to the first charging device.

5. The method of claim 4, wherein searching for the first vehicle to supply the additional power to the first charging device comprises searching for the first vehicle for which an amount of power obtained by excluding the amount of the power consumption based on the traveling distance to the first charging device from the amount of the surplus power of the first vehicle is greater than the amount of the power shortage of the first charging device.

6. The method of claim 1, wherein searching for the second charging device to supply the additional power to the second vehicle comprises searching for the second charging device based on the amount of the surplus power of each of the plurality of charging devices and the power state of the second vehicle.

7. The method of claim 6, wherein the power state of the second vehicle comprises information about the amount of the required power of the second vehicle and an amount of power consumption based on a traveling distance to the second charging device.

8. The method of claim 7, wherein searching for the second charging device to supply the additional power to the second vehicle comprises searching for the second charging device for which an amount of power obtained by adding the amount of the required power of the second vehicle and the amount of the power consumption based on the traveling distance to the second charging device is less than the amount of the surplus power of the second charging device.

9. A power sharing system, the system comprising:

a plurality of vehicles configured to determine an amount of required power or an amount of surplus power of each of the plurality of vehicles based on a power state of each of the plurality of vehicles;

a plurality of charging devices configured to determine an amount of required power or an amount of surplus power of each of the plurality of charging devices based on a power state of each of the plurality of charging devices;

a communicator configured to communicate with the plurality of vehicles and the plurality of charging devices; and a controller configured to:

search for a first vehicle among the plurality of vehicles to supply additional power to a first charging device among the plurality of charging devices or a second charging device among the plurality of charging devices to supply the additional power to a second vehicle among the plurality of vehicles based on the amount of the required power or the amount of the surplus power of each of the plurality of vehicles and the amount of the required power or the amount of the surplus power of each of the plurality of charging devices received through the communicator; and transmit a result of the search to the first charging device and the first vehicle or to the second charging device and the second vehicle through the communicator.

10. The system of claim 9, wherein the plurality of charging devices are configured to determine the amount of the required power or the amount of the surplus power of each of the plurality of charging devices based on an estimated amount of power generation and an estimated amount of the required power of each of the plurality of charging devices.

11. The system of claim 9, wherein, in response to the first charging device requiring the additional power, the controller is configured to search for the first vehicle based on an amount of power shortage of the first charging device and the power state of the first vehicle.

12. The system of claim 11, wherein the power state of the first vehicle comprises information about the amount of the surplus power of the first vehicle and an amount of power consumption based on a traveling distance to the first charging device.

13. The system of claim 12, wherein the controller is configured to search for the first vehicle to supply the additional power to the first charging device by searching for the first vehicle for which an amount of power obtained by excluding the amount of the power consumption based on the traveling distance to the first charging device from the amount of the surplus power of the first vehicle is greater than the amount of the power shortage of the first charging device.

14. The system of claim 9, wherein, in response to the second vehicle requiring the additional power, the controller is configured to search for the second charging device to supply the additional power to the second vehicle based on the amount of the surplus power of each of the plurality of charging devices and the power state of the second vehicle.

15. The system of claim 14, wherein the power state of the second vehicle comprises information about the amount of the required power of the second vehicle and an amount of power consumption based on a traveling distance to the second charging device.

16. The system of claim 15, wherein the controller is configured to search for the second charging device to supply the additional power to the second vehicle by searching for the second charging device for which an amount of power obtained by adding the amount of the required power of the second vehicle and the amount of the power consumption based on the traveling distance traveled to the second charging device is less than the amount of the surplus power of the second charging device.

17. A power sharing method, the method comprising:

determining a power state of a plurality of vehicles and a power state of a plurality of charging devices;

determining whether a first charging device among the plurality of charging devices requires additional power;

in response to a determination that the first charging device requires the additional power, searching for a first vehicle among the plurality of vehicles to supply the additional power to the first charging device based on the power state of the first vehicle and an amount of a power shortage of the first charging device;

in response to a determination that the first charging device does not require the additional power, determining whether a second vehicle among the plurality of vehicles requires the additional power;

in response to a determination that the second vehicle requires the additional power, searching for a second charging device among the plurality of charging devices to supply the additional power to the second vehicle based on the power state of the second vehicle and an amount of surplus power of each of the plurality of charging devices; and transmitting a result of the searching to the first charging device and the first vehicle or to the second charging device and the second vehicle.

18. The method of claim 17, wherein:

the power state of the first vehicle comprises information about an amount of surplus power of the first vehicle and an amount of power consumption based on a traveling distance to the first charging device; and the first vehicle is a vehicle for which an amount of power obtained by excluding the amount of the power consumption based on the traveling distance to the first charging device from the amount of the surplus power of the first vehicle is greater than the amount of the power shortage of the first charging device.

19. The method of claim 17, wherein the power state of the second vehicle comprises information about an amount of required power of the second vehicle and an amount of power consumption based on a traveling distance to the second charging device.

20. The method of claim 19, wherein the second charging device is a charging device for which an amount of power obtained by adding the amount of the required power of the second vehicle and the amount of the power consumption based on the traveling distance to the second charging device is less than the amount of the surplus power of the second charging device.

* * * * *